Patented Jan. 3, 1939

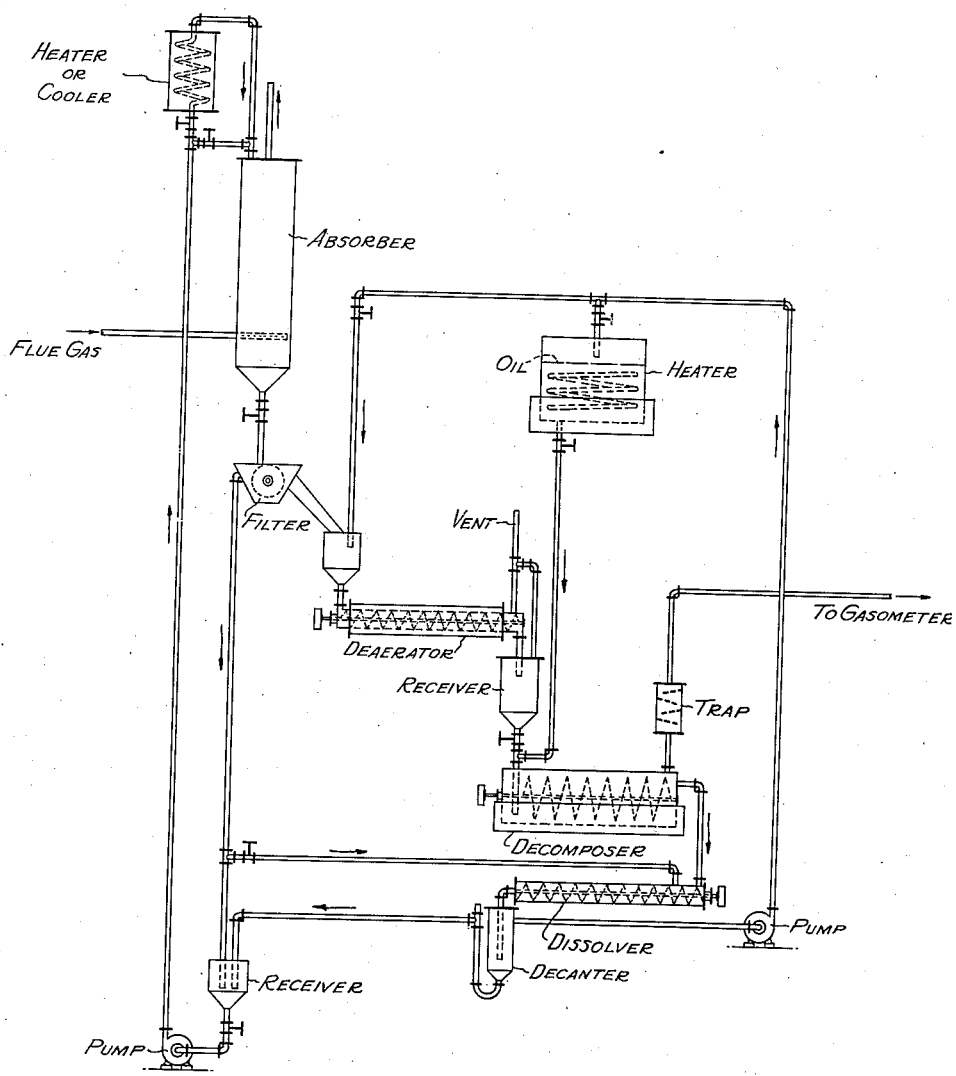

2,142,917

UNITED STATES PATENT OFFICE 2,142,917

RECOVERY OF CARBON DIOXIDE

Gustave T. Reich, Philadelphia, Pa.

Application February 16, 1938, Serial No. 190,860

14 Claims. (Cl. 23—150)

This invention relates to the recovery of carbon dioxide and particularly to an improved method of recovering carbon dioxide from gases containing this substance by absorbing the carbon dioxide in alkali carbonate solutions and decomposing the alkali bicarbonate thus formed by heat.

A principal object of the invention is the provision of a method whereby the recovery of carbon dioxide may be effected more efficiently, with lower heat expenditure and smaller space requirements than heretofore.

It has been found that the amount of heat required to decompose alkali bicarbonates in solid form is much less than that required to decompose these substances in solution. Furthermore since the rate of decomposition is much greater in the solid form, and the bulk is much smaller, the size of the apparatus required for a given production of carbon dioxide is very greatly reduced. However, the handling of solid alkali bicarbonates is mechanically difficult and expensive in labor requirements and is to be avoided as far as possible.

I have found that the high heat economy residing in the dissociation of solid alkali bicarbonate may be retained, together with all of the important advantages and economies of handling only fluid materials, by carrying the carbonation of the alkali carbonate solution beyond the point of separation of solid alkali bicarbonate, separating the solid bicarbonate and suspending it in an inert liquid medium, wherein it is dissociated by heating into carbon dioxide and alkali carbonate. The solid alkali bicarbonate when mixed with the inert liquid may be associated with sufficient water so that the alkali carbonate resulting from the dissociation will largely or entirely dissolve therein, but preferably the sodium bicarbonate is dewatered as far as is possible by filtration, centrifuging or the like, and water, or solution separated from the suspended bicarbonate, is added to the mixture of oil and carbonate to dissolve the carbonate so that the separation of the alkali carbonate from the inert liquid and its return to the carbonation operation is simple and easy.

The liquid medium should be inert to, and a non-solvent for, alkali carbonates and bicarbonates at the temperature of dissociation and immiscible with water. It should have a low volatility at 100° C. and for the use in the recovery of carbon dioxide for the production of dry ice, it should be odorless and tasteless. High-boiling liquid hydrocarbons, and particularly the medicinal grades of mineral oil, are especially suitable for use in the process of the invention.

In order to illustrate the principles of the invention, a method of recovering carbon dioxide from flue gas with a sodium carbonate solution embodying the invention will be specifically described with reference to the accompanying drawing showing a diagrammatic flow sheet of such a process.

The absorber contains a solution of sodium carbonate through which flue gas containing carbon dioxide is passed. The concentration of the sodium carbonate and its time of passage through the absorber are such that a substantial amount of solid sodium bicarbonate is formed therein. In order to insure the formation of solid sodium bicarbonate, the solution should contain at least 12 parts of sodium carbonate to each 100 parts of water. The residual gases pass out of the top of the absorber to waste and the suspension of sodium bicarbonate is drawn off at the bottom to a filter or other separating device.

In the filter, a thick slurry or paste of solid sodium bicarbonate is separated from the mother liquor, comprising a saturated solution of sodium bicarbonate which will normally contain greater or less amounts of sodium carbonate. The bicarbonate is then advantageously mixed with enough of the inert liquid, for example, an equal volume of refined high-boiling mineral oil, so that any air or undissolved gas contained therein will be released in the deaerator. The temperature of the mixture should not be high enough to effect any substantial dissociation of the sodium bicarbonate during the deaeration. The deaerated mix is then passed into the decomposer, together with a further amount of oil which has been heated to the dissociation temperature of sodium bicarbonate or preferably above this temperature. In the decomposer, additional heat may be supplied if necessary, through a jacket or heating coils, to effect the complete, or substantially complete, dissociation of the sodium bicarbonate into sodium carbonate and carbon dioxide. The sodium bicarbonate dissociates readily at 95 to 105° C. The oil may be preheated up to, for example, 150° to 200° C. or higher, so that all or a substantial portion of the heat of dissociation is supplied in this manner.

The carbon dioxide is drawn off to a holder, while the residual mixture of oil, sodium carbonate, and more or less water, according to the water content of the sodium bicarbonate slurry originally mixed with the oil, is mixed in the dissolver with sufficient mother liquor from the bicarbonate separation operation to completely dissolve the sodium carbonate. The sodium carbonate solution is separated from the oil in the decanter and is returned to the absorber, being heated or cooled, if necessary, to the desired temperature for the absorption.

The oil separated in the decanter is returned, in part, to be directly mixed with the sodium bicarbonate solution, and in part to the heater to be reheated for reuse in the decomposer. It will be seen that in the process described there is a continuous recirculation of oil through the right-hand side of the system and a continuous recirculation of alkali through the left-hand side of the system, with practically no opportunity for loss. The only material which has to be added to the system is the very small amount of water which passes out of the decomposer with the carbon dioxide.

Although the system of operation described for the purpose of illustration offers many advantages of operation, the invention is not limited to this particular system as many variations in arrangement and method of operation may be made without departing from the principles of the invention. Other high-boiling, inert liquids having the properties hereinbefore outlined may be used in place of mineral oil, and potassium carbonate may be used alone or in admixture with sodium carbonate as the absorbing agent. The oil added to the bicarbonate in the decomposer, or as it is fed to the decomposer, may be heated to a sufficient temperature to effect practically complete dissociation of the bicarbonate or a substantial proportion of the heat may be supplied to the mixture in the decomposer.

I claim:

1. In the production of carbon dioxide by the thermal dissociation of alkali bicarbonate, the improvement which comprises suspending the bicarbonate in a high-boiling inert liquid immiscible with aqueous solutions of alkali carbonates during the dissociation.

2. In the production of carbon dioxide by the thermal dissociation of alkali bicarbonate, the improvement which comprises suspending solid bicarbonate in a high-boiling inert liquid immiscible with aqueous solutions of alkali carbonates during the dissociation.

3. In the production of carbon dioxide by the thermal dissociation of alkali bicarbonate, the improvement which comprises suspending the bicarbonate in a high-boiling mineral oil during the dissociation.

4. In the production of carbon dioxide by the thermal dissociation of alkali bicarbonate, the improvement which comprises suspending the bicarbonate in a high-boiling mineral oil during the dissociation, and supplying a substantial portion of the heat of dissociation by preheating the mineral oil.

5. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, and thermally decomposing the alkali bicarbonate into carbon dioxide and alkali carbonate while it is mixed with said liquid.

6. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling mineral oil, and thermally decomposing the alkali bicarbonate into carbon dioxide and alkali carbonate while it is mixed with said liquid.

7. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling mineral oil, and thermally decomposing the alkali bicarbonate into carbon dioxide and alkali carbonate while it is mixed with said liquid, a substantial portion of the heat of dissociation being supplied by preheating the mineral oil before mixing it with the alkali bicarbonate.

8. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, thermally decomposing the alkali bicarbonate into carbon dioxide and alkali carbonate while it is mixed with said liquid, adding liquor separated from the alkali bicarbonate to the resulting mixture of inert liquid and alkali carbonate, and separating the aqueous liquor from the inert liquid.

9. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, thermally decomposing the alkali bicarbonate into carbon dioxide and alkali carbonate while it is mixed with said liquid, adding liquor separated from the alkali bicarbonate to the resulting mixture of inert liquid and alkali carbonate, separating the aqueous liquor from the inert liquid, and subjecting the liquor to the further action of carbon dioxide-containing gases.

10. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonate, thermally decomposing the alkali bicarbonate into carbon dioxide and alkali carbonate while it is mixed with said liquid, adding liquor separated from the alkali bicarbonate to the resulting mixture of inert liquid and alkali carbonate, separating the aqueous liquor from the inert liquid, and mixing the separated inert liquid from further solid alkali bicarbonate.

11. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, thermally decomposing the alkali bicarbonate into carbon dioxide and alkali carbonate while it is mixed with said liquid, adding liquor separated from the alkali bicarbonate to the resulting mixture of inert liquid and alkali carbonate, separating the aqueous liquor from the inert liquid, heating the separated liquor, and mixing it with further solid alkali bicarbonate.

12. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, deaerating the mixture, and subjecting the mixture to a temperature at which the alkali bicarbonate is dissociated into carbon dioxide and alkali carbonate.

13. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, deaerating the mixture, adding a further portion of the inert liquid to the mixture, and subjecting the mixture to a temperature at which the alkali bicarbonate is dissociated into carbon dioxide and alkali carbonate.

14. A method of recovering carbon dioxide which comprises passing a gas containing carbon dioxide through a solution of alkali carbonate until solid alkali bicarbonate is formed, separating the solid alkali bicarbonate, admixing the separated alkali bicarbonate with a high-boiling inert liquid immiscible with aqueous solutions of alkali carbonates, deaerating the mixture, and adding to the mixture a further portion of the inert liquid which has been preheated to a temperature sufficient to raise the mixture to a temperature at which the alkali bicarbonate is dissociated into carbon dioxide and alkali carbonate.

GUSTAVE T. REICH.